United States Patent [19]

Bartek et al.

[11] 3,911,216

[45] Oct. 7, 1975

[54] NONLINEAR CODE GENERATOR AND DECODER FOR TRANSMITTING DATA SECURELY

[75] Inventors: Douglas J. Bartek, Phoenix; Thomas H. Howell, Scottsdale, both of Ariz.

[73] Assignee: Honeywell Information Systems, Inc., Phoenix, Ariz.

[22] Filed: Dec. 17, 1973

[21] Appl. No.: 425,590

[52] U.S. Cl. .................. 178/22; 331/78; 340/172.5
[51] Int. Cl.[2] .................. H04L 9/04
[58] Field of Search .................. 178/22; 331/78

[56] References Cited

UNITED STATES PATENTS

| | | | |
|---|---|---|---|
| 3,421,146 | 1/1969 | Zegers | 178/22 |
| 3,515,805 | 6/1970 | Fracassi et al. | 178/22 |
| 3,614,316 | 10/1971 | Andrews, Jr. | 178/22 |
| 3,691,472 | 9/1972 | Bohman | 331/78 |
| 3,700,806 | 10/1972 | Vasseur | 178/22 |
| 3,711,645 | 1/1973 | Ehrat | 178/22 |
| 3,761,696 | 9/1973 | Russell | 331/78 |
| 3,784,743 | 1/1974 | Schroeder | 178/22 |
| 3,796,830 | 3/1974 | Smith | 178/22 |
| 3,838,259 | 9/1974 | Kortenhaus | 331/78 |

*Primary Examiner*—Maynard R. Wilbur
*Assistant Examiner*—H. A. Birmiel
*Attorney, Agent, or Firm*—Edward W. Hughes

[57] ABSTRACT

A code generator for encoding digital data includes a first feedback shift register for code generation and at least a second feedback shift register interconnected with the first shift register whereby the generated code is effectively nonlinear. Clear text may be applied as an input to the first shift register or the generated code may be applied to the clear text outside of the first shift register. Similar decoding apparatus is employed to recover the clear text from the transmitted cryptogram.

4 Claims, 6 Drawing Figures

| STAGES / INPUT | C5 | C4 | C3 | C2 | C1 | D3 | D2 | D1 | M | FINAL OUTPUT |
|---|---|---|---|---|---|---|---|---|---|---|
| | 0 | 0 | 0 | 0 | 0 | 1 | 0 | 0 | 0 | – |
| 1 | 1 | 0 | 1 | 0 | 0 | 0 | 1 | 0 | 0 | 1 |
| 0 | 0 | 1 | 0 | 1 | 0 | 0 | 0 | 1 | 1 | 0 |
| 1 | 1 | 0 | 0 | 0 | 1 | 1 | 1 | 0 | 0 | 0 |
| 1 | 1 | 1 | 1 | 0 | 0 | 0 | 1 | 1 | 1 | 0 |
| 1 | 1 | 1 | 0 | 1 | 0 | 1 | 1 | 1 | 1 | 0 |
| 0 | 0 | 1 | 1 | 0 | 1 | 1 | 0 | 1 | 1 | 1 |
| 0 | 0 | 0 | 1 | 1 | 0 | 1 | 0 | 0 | 0 | 0 |
| 0 | 0 | 0 | 0 | 1 | 1 | 0 | 1 | 0 | 0 | 0 |
| 0 | 0 | 0 | 0 | 0 | 1 | 0 | 0 | 1 | 1 | 1 |
| 1 | 1 | 0 | 1 | 0 | 0 | 1 | 1 | 0 | 0 | 1 |
| 1 | 1 | 1 | 1 | 1 | 0 | 0 | 1 | 1 | 1 | 1 |

| STAGES | F3 | F2 | F1 | M | CODED INPUT | X | E5 | E4 | E3 | E2 | E1 | CLEAR TEXT |
|---|---|---|---|---|---|---|---|---|---|---|---|---|
| | 1 | 0 | 0 | 0 | | – | 0 | 0 | 0 | 0 | 0 | – |
| | 0 | 1 | 0 | 0 | 1 | 1 | 0 | 0 | 0 | 0 | 1 | 1 |
| | 0 | 0 | 1 | 1 | 0 | 0 | 1 | 0 | 1 | 0 | 0 | 0 |
| | 1 | 1 | 0 | 0 | 0 | 1 | 0 | 1 | 0 | 1 | 1 | 1 |
| | 0 | 1 | 1 | 1 | 0 | 0 | 1 | 0 | 0 | 0 | 1 | 1 |
| | 1 | 1 | 1 | 1 | 0 | 1 | 1 | 1 | 1 | 0 | 1 | 1 |
| | 1 | 0 | 1 | 1 | 1 | 0 | 1 | 1 | 0 | 1 | 0 | 0 |
| | 1 | 0 | 0 | 0 | 0 | 1 | 0 | 1 | 1 | 0 | 0 | 0 |
| | 0 | 1 | 0 | 0 | 0 | 0 | 0 | 0 | 1 | 1 | 0 | 0 |
| | 0 | 0 | 1 | 1 | 1 | 1 | 0 | 0 | 0 | 1 | 0 | 0 |
| | 1 | 1 | 0 | 0 | 1 | 0 | 0 | 0 | 0 | 0 | 1 | 1 |
| | 0 | 1 | 1 | 1 | 1 | 1 | 1 | 0 | 1 | 0 | 1 | 1 |

NONLINEAR CODE GENERATOR AND DECODER FOR TRANSMITTING DATA SECURELY

BACKGROUND OF THE INVENTION

This invention relates generally to cryptography, and more particularly to code generators for enciphering and deciphering digital data for secure data transmission.

As use of digital computer systems becomes more universally accepted and utilized in storing, processing, and communicating information, concern for securing the confidentiality of such information becomes a primary concern. The security threat to computer systems may be considered the inability to provide a sufficiently strong technical defense against a user deliberately attempting to penetrate the system for hositle purposes, particularly monitoring and/or altering the information therein.

The enciphering or scrambling of data in accordance with an established code is becoming more widely employed with commercial computer systems. Pseudorandom code sequences can be easily generated by employing linear feedback shift registers as discussed by Twigg, "Need to Keep Digital Data Secure," Electronic Design 23, Nov. 9, 1972, pages 68–71. However, such pseudorandom codes can be relatively easily broken as discussed by Mayer and Tuchman, "Pseudorandom Codes Can be Broken," Electronic Design 23, Nov. 9, 1972, pages 74–76. As recognized by Mayer and Tuchman, a linear relationship exists between the clear text and the enciphered text, and only a limited amount of information is required to break the code.

More secure code systems have been devised, particularly for military applications, but such systems typically are complex in structure and expensive to implement.

SUMMARY OF THE INVENTION

An object of the present invention is an improved code generator for transmitting digital data securely and having a code which is difficult to break.

Another object of the invention is a nonlinear code encoder and decoder which is simple and economical.

Still another object of the invention is an improved, nonlinear code generator employing feedback shift registers.

Features of the invention include a first shift register having at least one feedback path between two stages. Additionally, a second shift register having at least one feedback path between two stages provides an input to one stage of said first shift register through adder means whereby said input and the output from the preceding stage of said first shift register are added and the sum is applied as the input to said one stage of said first shift register. Depending on the interconnection between the first and second shift registers, the clear text may be applied as an input to the first shift register with the enciphered data taken as an output from the first shift register, or alternatively the code from the first shift register can be applied to the clear text outside of the first shift register.

These and other objects and features of the invention will be more readily apparent when the following detailed description of an illustrated embodiment and the appended claims are taken with the drawing.

DESCRIPTION OF ILLUSTRATIVE EMBODIMENTS

Figure 1:
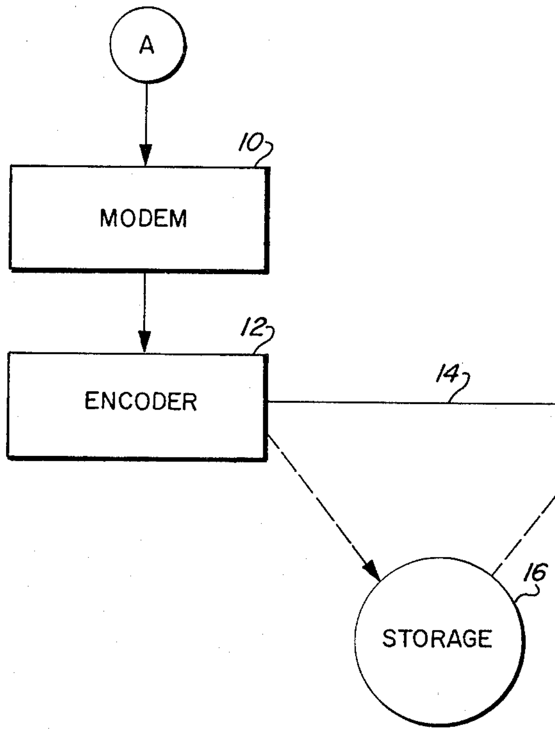
FIG. 1 is a general block diagram of a digital data communications system in which the present invention is applicable.

Referring now to the drawings, FIG. 1 is a general block diagram of a digital data communication system in which the present invention is applicable. Typically, a station A may wish to communicate data either directly or indirectly to a second station B. The data will be applied through a modem 10 or like communication transmitter to an encoder 12 and then passed directly by a communication line 14 or indirectly through employment of a storage medium 16 to station B where the enciphered data is applied to decoder 18 with the clear text received by modem 20.

As discussed above, without the provision of an encoder 12 and decoder 18, the transmitted data is easily susceptible to being monitored or altered by an outside party. While sophisticated encoding systems are known, such systems are not economically and technically feasible for commercial data transmission. As further discussed above, simpler encoding systems have been proposed but because of the linearity of the encoders the codes may be easily broken by an experienced cryptographer.

In accordance with the present invention, a code generator is provided which is nonlinear and thus is more difficult to decipher by an unauthorized third party. In its simplest configuration, the encoder includes a first shift register having at least one feedback path between two stages and a second shift register having at least one feedback path between two stages which provides an input to at least one stage of the first shift register, thereby effecting a nonlinearity in the first shift register. Depending on the interconnection between the first and second shift registers, the clear text may be applied as input to the first shift register with the enciphered data taken as an output of the first shift register, or alternatively the code from the first shift register can be applied to the clear text outside of the first shift register.

Figures 2, 3:
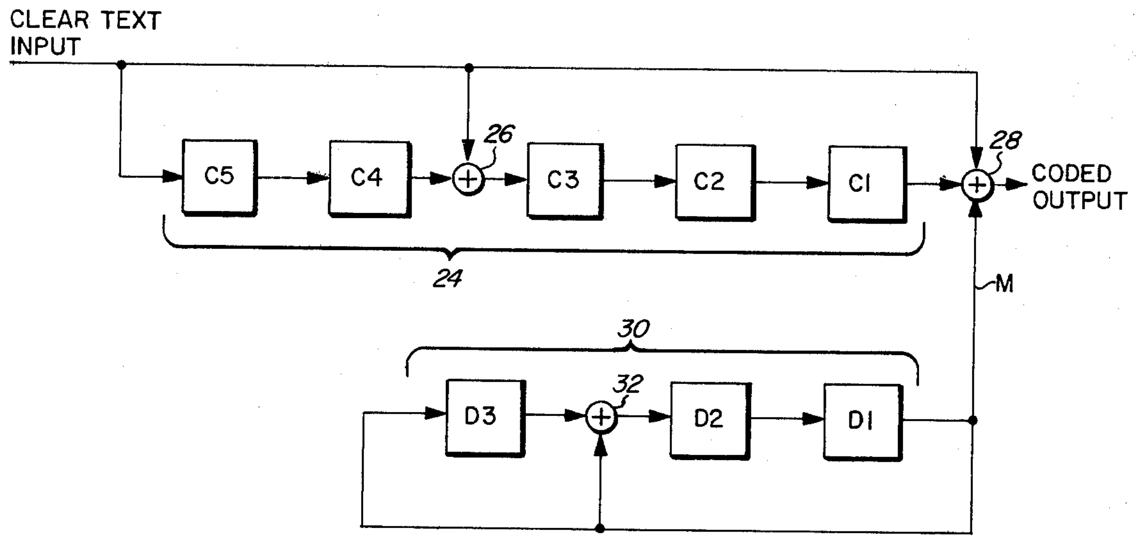
FIG. 2 is a functional block diagram of a code generator in accordance with the present invention.
FIG. 3 is a table illustrating the transformation of clear text to a cryptogram using the code generator of FIG. 2.

Consider now one embodiment of the present invention as illustrated in block diagram form in FIG. 2. A first shift register shown generally at 24 comprises five stages designated C1 through C5 with a modulo 2 adder 26 interconnecting stage C4 and stage C3. Structurally, the modulo 2 adder 26 may comprise a dual input exclusive OR-gate. A clear text input is applied to stage C5 and to modulo 2 adder 26 between stages C4 and C3 and also to a modulo 2 adder 28 which is connected to the output of stage C1. This portion of the code generator is similar to the previously proposed linear feedback shift registers. Additionally, however, a second shift register shown generally at 30 and comprising three stages D1 through D3 provides an input designated M to modulo 2 adder 28. Shift register 30 includes a modulo 2 adder 32 interconnecting stages D3 and D2 with feedback provided from the output of D1 to modulo 2 adder 32 and to the input of stage D3. The inclusion of the second feedback shift register 30 with an output therefrom being applied to modulo 2 adder 28 renders the operation of shift register 24 nonlinear, i.e., over a much greater operating range the code generated by shift register 24 is nonrepetitive. Thus, the coded output taken at the output of modulo 2 adder 28 is much more difficult to decipher by one not having access to the applied code.

FIG. 3 is a table illustrating the transformation of a clear text input to a cryptogram final output using the code generator of FIG. 2. Initially, it will be noted that all stages of the two shift registers 24 and 30 may be set to zero except for at least one stage of shift register 30 which cycles independently from shift register 24. Thereafter, as each clear text input signal is applied at the input, the stages of the two shift registers change states in accordance with the table, with the coded final output bearing no apparent relationship to the input clear text.

Figures 4, 5:
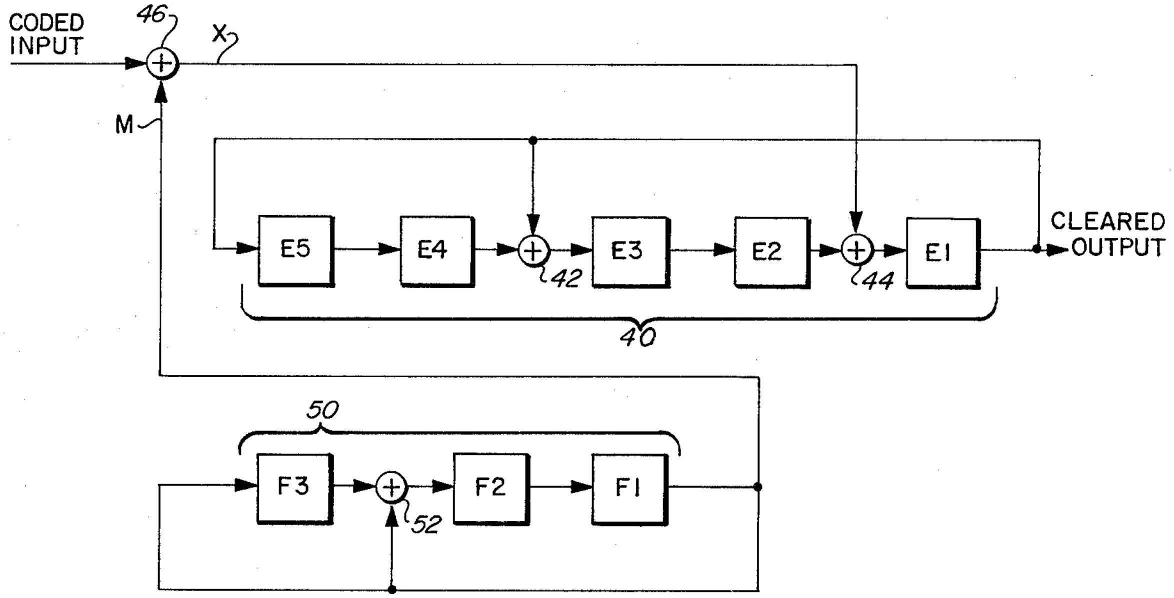
FIG. 4 is a functional block diagram of a decoder for use in deciphering the cryptogram produced by the code generator of FIG. 2.
FIG. 5 is a table illustrating the transformation of the cryptogram to clear text using the decoder of FIG. 4.

To decode the coded text from the code generator shown in FIG. 2 a decoder similar in structure to the encoder is provided. FIG. 4 is a functional block diagram of a decoder for use in deciphering the cryptogram produced in the code generator of FIG. 2. Again, the decoder includes a first feedback shift register shown generally at 40 and including five stages designated E1 through E5. A modulo 2 adder 42 interconnects stage E4 to stage E3 and a second modulo 2 adder 44 interconnects stage E2 to stage E1. Feedback from the output stage E1 is applied to adder 42 and to the input of stage E5. The coded input is applied to modulo 2 adder 46 with the output from adder 46 being applied as one input to adder 44. A second feedback shift register shown generally at 50 and including three stages designated $F_1$ through $F_3$ provides a second input M to modulo 2 adder 46. Shift register 50, which cycles independently from shift register 40, includes a modulo 2 adder 52 which connects stage F3 to stage F2, and the output of stage F1 is applied as feedback to the input of stage F3 and as an input to modulo 2 adder 52. The output from the decoder is taken at the output of stage E1 of shift register 40.

FIG. 5 is a table illustrating the transformation of the coded input back to clear text with the decoder of FIG. 4. Again, initially all stages of the two shift registers may be set to zero except for at least one stage of shift register 50 wherein F3 is set to a "1." It will be noted that the 1 in stage F3 corresponds to the 1 in stage D3 in the code generator of FIG. 2 as initial conditions. The table reveals that as the coded input is applied to the decoder of FIG. 4, the clear text which was initially applied as an input to the code generator in FIG. 2 appears at the output of the decoder.

In these relatively simple embodiments illustrating the invention, only two feedback shift registers are employed with the second shift register cycling independently from the first shift register and effecting a nonlinearity in the operation of the first shift register. Additionally, it will be noted that the output from the independent shift register is applied at the last stage of the first shift register. If this output is applied to any other stage of the first shift register, then the clear text must not be applied as an input to the first shift register but must be scrambled with the generated code outside of the shift register by means of a modulo 2 adder, for example. In other embodiments of the invention the second shift register may be incorporated in the feedback loop and/or additional shift registers may be incorporated into the system thereby increasing the complexity of the generated code.

Figure 6:
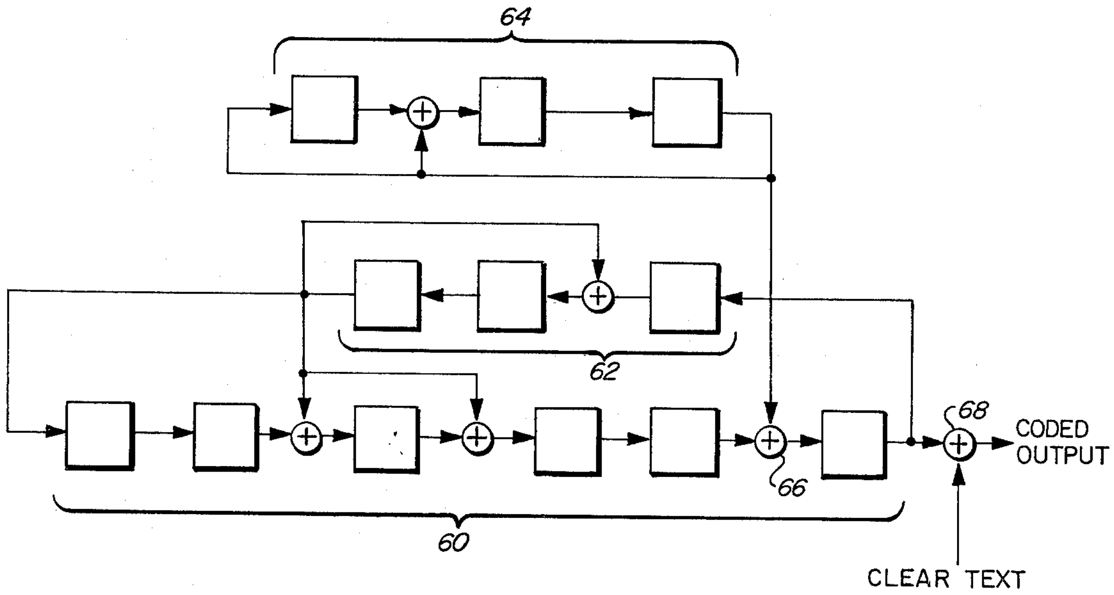
FIG. 6 is a functional block diagram of another code generator in accordance with the present invention.

FIG. 6 is a functional block diagram of another code generator in accordance with the present invention and embodying each of these additional features. Briefly, a first feedback shift register 60 provides the code output to adder 68 with the second shift register 62 connected in the feedback path of shift register 60. Thus, shift register 62 is no longer cycling independently from the first shift register 60 and, effectively, the feedback path becomes nonlinear. Additionally, a third shift register 64 is provided which cycles independently from registers 60 and 62, with shift register 64 providing an input to a modulo 2 adder 66 in the first shift register 60. Accordingly, the code key output from register 60 has increased complexity and nonlinearity over the more simple code generators illustrated in FIG. 2. Since inputs are being applied to shift register 60 from shift register 62 at stages other than the last stage, the generated code must be applied to the clear text through adder 68 outside of shift register 60, rather than internal to shift register 60 as in FIG. 2.

Coders and decoders in accordance with the present invention offer increased security over other known code generators employing feedback shift registers, yet the coders and decoders retain the desirability of being implemented in a large scale integrated circuit array thereby minimizing cost and size. Additionally, coders and decoders in accordance with the present invention have greater speed ability than some other known coders and decoders which employ bipolar devices and complex gating arrays.

While the invention has been described with reference to specific embodiments, the description is illustrative and is not to be construed as limiting the scope of the invention. Various modifications and changes may occur to those skilled in the art without departing from the true spirit and scope of the invention as defined by the appended claims.

What is claimed is:

1. Code apparatus for use in the transmission of digital data in coded form comprising a first shift register having a plurality of serially connected bistable stages, at least one feedback loop interconnecting the output of one stage and the input of a preceding stage of said first shift register; a second shift register having a plurality of serially connected bistable stages, said second shift register interconnected in said feedback loop of said first shift register whereby cycling of said first and second shift registers is interdependent; at least one feedback loop interconnecting the output of one stage and the input of a preceding stage of said second shift register; and logic means interconnecting the output of one stage of said second shift register to said first shift register whereby said first and second shift registers cooperatively function to produce an effectively nonlinear code.

2. Code apparatus as defined by claim 1 wherein said apparatus includes a third shift register having a plurality of serially connected bistable stages and at least one feedback loop interconnecting the output of one stage and the input of a preceding stage, and means interconnecting the output of one stage of said third shift register to a shift register stage outside of said third shift register.

3. Code apparatus as defined by claim 2 wherein said means interconnecting the output of one stage of said third shift register includes adder means at the input of one stage of said first shift register.

4. Code apparatus as defined by claim 2 wherein said third shift register cycles independently from said first and second shift registers.

* * * * *